Patented July 26, 1927.

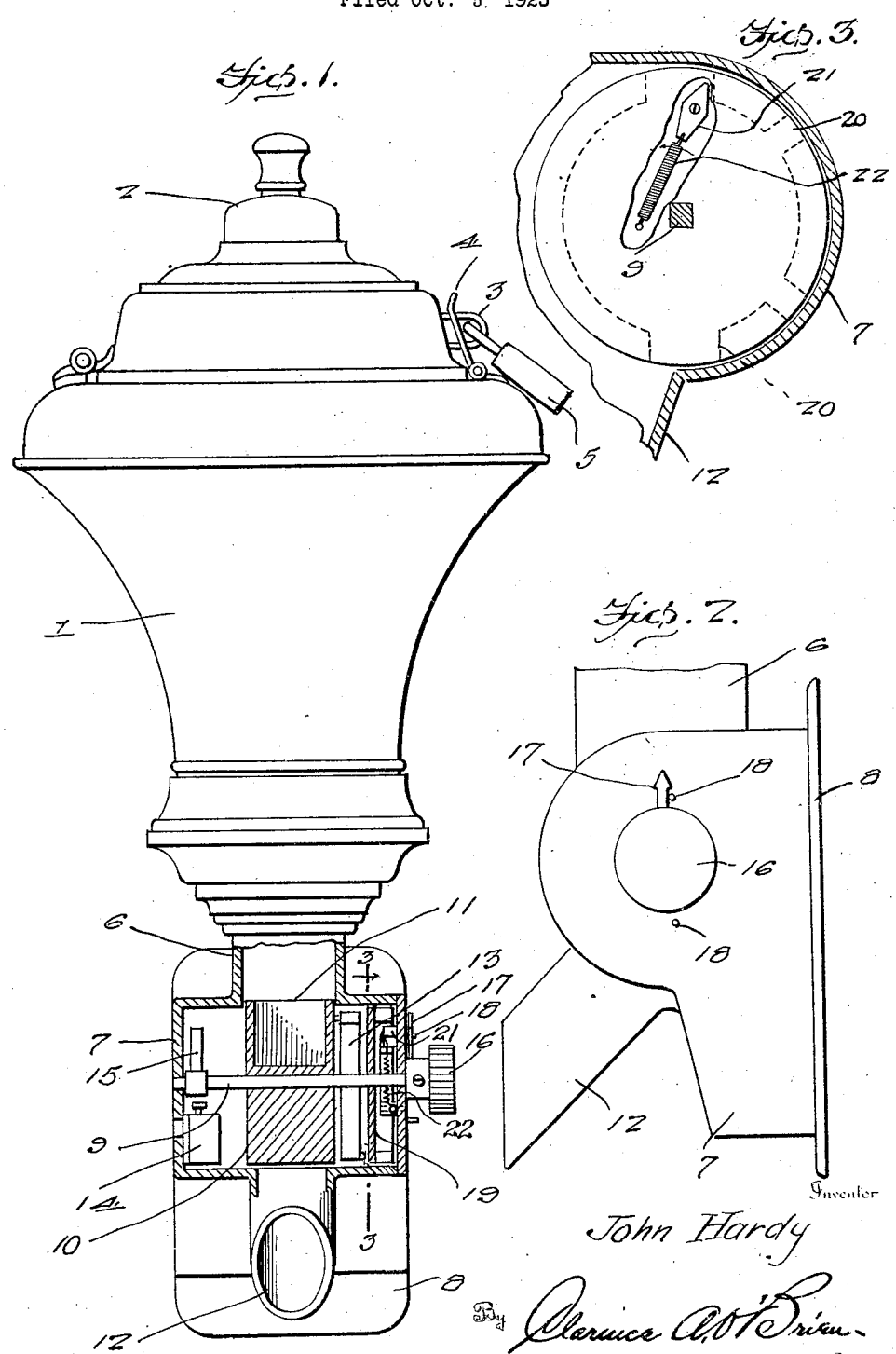

1,636,910

UNITED STATES PATENT OFFICE.

JOHN HARDY, OF BROOKLYN, NEW YORK.

TEA-DISPENSING MACHINE.

Application filed October 5, 1925. Serial No. 60,550.

This invention relates to an improved tea dispensing machine, and it has more particular reference to one which is especially, although not necessarily, designed for use in restaurants and hotels for dispensing a predetermined quantity of tea to the individual patron.

Briefly, the invention relates to a machine embodying a covered hopper in which the tea in bulk is placed, this hopper having a discharge neck at its bottom communicating with a housing in which a drum is rotatably mounted, the drum being formed with a pocket in its periphery which is filled with tea, so that by turning the drum through an approximate half revolution, the cup is inverted to dispense the tea into a discharge spout, beneath which the tea pot of the individual is placed.

One feature of the invention is the particular construction of the housing in which said drum is located, the housing being constructed to accommodate a register for recording the number of portions dispensed, the register being operated by a tappet on the shaft which carries the aforesaid drum, whereby to permit an accurate tab to be maintained so that the quantity of tea in the hopper may be replenished at the proper time.

Another feature of the invention is a spring which serves to automatically return the cup of the drum to receiving position after each portion of tea is dispensed.

It is also a feature of the invention to provide novel indicating means for showing the position of the drum on the exterior of the housing and, to provide spring pressed means for retarding the movement of the drum to its normal position after each operation.

Other features and advantages of the invention will become apparent from the following description and drawings.

In the accompanying drawings forming a part of which application and in which like numerals are employed to designate like parts throughout the same:—

Figure 1 is a side view with a portion broken away and shown in section, of a tea dispensing machine constructed in accordance with the present invention, Fig. 2 is a fragmentary side elevation of the housing for the drum and the external indicating means, and Fig. 3 is a detail sectional and elevational view showing the improved check.

Referring to the drawings in detail, the reference character 1 designates a hopper. This may be of any suitable configuration and it is preferably ornamental in configuration and formed with a hingedly mounted cover 2. The cover is provided with a staple 3, while on the relatively stationary body portion is formed a hasp 4 and a padlock 5 has its shackle associated with these to maintain the cover normally closed. At its bottom, the hopper is reduced considerably in size and is formed with a restricted discharge neck 6 and this merges into and has communication with an appropriately shaped housing 7. The housing is formed with outstanding attaching flanges 8 by means of which the device may be fastened upon a wall or other appropriate support.

Mounted for rotation in the central portion of the housing is a horizontal oscillatory shaft 9 upon which a cylindrical drum 10 is fixedly mounted. It will be noticed from Fig. 1, that this drum is formed in its periphery with a recess 11 which serves as a receiving cup for the tea. The cup is of a predetermined size to receive a predetermined quantity and to dispense it. The quantity will be governed by the size of the cup as ordinarily supplied to the patrons of the restaurants.

In all instances, sufficient tea will be dispensed to make a liquid of uniform strength. It will be noted that the drum is in alinement with a suitably shaped discharge spout 12 at the bottom of the housing. It will also be noted that a flat spring 13 is connected in the drum and anchored at its opposite end into the housing and this serves to automatically return the cup 11 to the position shown in Fig. 1.

As before intimated, a conventional automatic register 14 is arranged in the housing beneath the shaft and the shaft is provided with a tappet 15 which engages the plunger for depressing the same and operating the register. In this way, an accurate tab may be maintained upon the quantity of tea already dispensed. It is estimated that the hopper will be of a size to accommodate a quantity of tea sufficient to supply about one hundred patrons, and the register will indicate the number already served so that it may be accurately known when to replenish the supply.

One end of the shaft 9 extends to the exterior of the housing and is provided with a knob 16. On this knob is a pointer 17 cooperable with stop pins 18. Also mounted on the shaft inside of the housing is a disk 19 provided at circumferentially spaced points with peripheral recesses 20 and intermediate shoulders 20'. A pivotally mounted elliptical pawl 21 is adapted to cooperate with these recesses in retarding the return of the oscillatory drum to its normal position after each operation. This pawl is pivotally mounted between its ends upon the removable end plates of the housing 7 and connected to one end is a coiled spring 22 which is anchored at its opposite end on said plate. Consequently, when the drum 10 is rotated, the shoulders 20' formed on the disk 19 successively engage the pointed end of the pawl thus producing the desired ratchet action and retarding the rotation of the drum in both directions.

The operation of the machine is as follows:—Ordinarily the cup 11 is disposed upwardly and in alinement with the discharge neck 6 of the hopper and is thus filled with a quantity of tea. At this time the indicating arrow 17 is directed upwardly to indicate the position of the drum. Now by grasping the handle 16 and rotating the drum through an approximate half revolution, the cup 11 is turned into dumping position. When in dumping position, the indicating arrow 17 shows this and is then engaged with the lower stop pin 18. The tea now gravitates to the discharge spout and into the receiving pot which is placed therebeneath.

In practice, boiling water in an appropriate container will be disposed in close proximity to the machine so that by placing this on the tea, a pot of hot tea will be freshly made. As soon as the handle 16 is released, the spring 13 will return the drum to normal position for receiving another quantity of tea.

During this operation, the cooperating check 21 and notched or recessed disk 19 cooperate to retard the return of the drum to prevent destruction of the indicating arrow 17 and stop pins 18.

It is believed that by considering the description in connection with the drawings, persons familiar with devices of this class will be able to obtain a clear understanding of the same. Therefore a more lengthy description is thought unnecessary.

While the preferred embodiment of the invention has been shown and described, it is to be understood that minor changes coming within the field of invention claimed may be resorted to if desired.

Having thus described my invention, what I claim as new is:—

In a tea dispensing machine of the class described, a hopper having a discharge neck, a housing connected with said neck, said housing being provided with an attaching flange, being of hollow form and including a downwardly inclined discharge spout through which the tea is adapted to gravitate, a shaft mounted for oscillation in said housing, a drum on said shaft, said drum being provided with a tea receiving pocket in its periphery normally registering with said neck and adapted to be rotated through an approximate half circle to bring it into registration with said spout, spring means for automatically retaining the drum to maintain the pocket in registry with said neck, a disk mounted upon said shaft and located in said housing, said disk being provided with circumferentially spaced stop shoulders, and a resilient check device mounted on the adjacent end wall of said housing and embodying a pivotally mounted pawl cooperable with said shoulders.

In testimony whereof I affix my signature.

JOHN HARDY.